(12) United States Patent
Vasseur

(10) Patent No.: US 7,995,500 B2
(45) Date of Patent: Aug. 9, 2011

(54) MANAGING AN AMOUNT OF TUNNELS IN A COMPUTER NETWORK

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 769 days.

(21) Appl. No.: 11/606,973

(22) Filed: Nov. 30, 2006

(65) Prior Publication Data

US 2008/0130515 A1 Jun. 5, 2008

(51) Int. Cl.
*H04L 12/28* (2006.01)

(52) U.S. Cl. ........ 370/254; 370/235; 370/236; 370/338; 370/349; 370/389; 370/395.21; 370/400; 370/401; 370/437; 370/468; 709/224; 709/226; 709/238

(58) Field of Classification Search .................. 370/349, 370/401, 395.21, 468, 437, 235, 389, 236, 370/400, 338; 709/226, 224, 238
See application file for complete search history.

(56) References Cited

U.S. PATENT DOCUMENTS

| | | | |
|---|---|---|---|
| 6,339,595 B1 | 1/2002 | Rekhter et al. | |
| 6,473,421 B1 | 10/2002 | Tappan | |
| 6,526,056 B1 | 2/2003 | Rekhter et al. | |
| 6,778,492 B2 | 8/2004 | Charny et al. | |
| 6,842,463 B1 * | 1/2005 | Drwiega et al. | 370/468 |
| 6,917,618 B2 | 7/2005 | Thubert et al. | |
| 6,978,394 B1 | 12/2005 | Charny et al. | |
| 7,016,337 B1 | 3/2006 | Wu et al. | |
| 7,023,879 B1 | 4/2006 | Sitaraman et al. | |
| 7,031,262 B2 | 4/2006 | Vasseur et al. | |
| 7,042,838 B1 | 5/2006 | Shand et al. | |
| 7,107,613 B1 | 9/2006 | Chen et al. | |
| 7,171,491 B1 | 1/2007 | O'Toole et al. | |
| 2002/0085498 A1 * | 7/2002 | Nakamichi et al. | 370/236 |
| 2002/0172175 A1 * | 11/2002 | Okamura | 370/338 |
| 2003/0014540 A1 * | 1/2003 | Sultan et al. | 709/240 |
| 2003/0126287 A1 | 7/2003 | Charny et al. | |
| 2003/0233595 A1 | 12/2003 | Charny et al. | |
| 2004/0028054 A1 * | 2/2004 | Khurana et al. | 370/395.21 |
| 2004/0034702 A1 * | 2/2004 | He | 709/224 |
| 2005/0063411 A1 * | 3/2005 | Wang et al. | 370/437 |
| 2005/0144282 A1 * | 6/2005 | Argo | 709/226 |
| 2005/0259664 A1 | 11/2005 | Vasseur et al. | |

OTHER PUBLICATIONS

Rosen, E. et al., Request for Comments 4364, entitled "BGP/MPLS IP Virtual Private Networks (VPNs)", Network Working Group, IETF, Feb. 2006, pp. 1-44.

(Continued)

*Primary Examiner* — Pankaj Kumar
*Assistant Examiner* — Gautam Sharma
(74) *Attorney, Agent, or Firm* — Cesari and McKenna, LLP

(57) ABSTRACT

In one embodiment, a maximum amount of available tunnels in a computer network to be shared by one or more path computation devices is configured on the path computation devices. Each path computation device then decrements the amount of available tunnels in response to establishment of a tunnel, and increments the amount of available tunnels in response to destruction (i.e., tear-down) of an established tunnel. Updates to the amount of available tunnels in the network may be exchanged among the path computation devices through advertisements issued by one or more devices after decrementing or incrementing the amount. A tunnel may be established (e.g., computed) in response to the amount of available tunnels being greater than or equal to the amount of the tunnel to be established.

23 Claims, 6 Drawing Sheets

OTHER PUBLICATIONS

Sangli, S. et al., Request for Comments 4360, entitled "BGP Extended Communities Attribute", Network Working Group, IETF, Feb. 2006, pp. 1-12.

Awduche, D. et al., Request for Comments 3209, entitled "RSVP-TE: Extensions to RSVP for LSP Tunnels", Network Working Group, IETF, Dec. 2001, pp. 1-57.

Smit, H. et al., Request for Comments 3784, entitled "Intermediate System to Intermediate System (IS-IS) Extensions for Traffic Engineering (TE)", Network Working Group, IETF, Jun. 2004, pp. 1-13.

Katz, D. et al., Request for Comments 3630, entitled "Traffic Engineering (TE) Extensions to OSPF Version 2", Network Working Group, IETF, Sep. 2003, pp. 1-14.

Farrel, A. et al., Request for Comments 4655, entitled "A Path Computation Element (PCE)-Based Architecture", Network Working Group, IETF, Aug. 2006, pp. 1-38.

Vasseur, JP. et al., Internet-Draft, entitled "Path Computation Element (PCE) Communication Protocol (PCEP)—Version 1 (draft-ietf-pce-pcep-03.txt)", Network Working Group, IETF, Oct. 2006, pp. 1-61.

U.S. Appl. No. 11/302,586, entitled "Technique for Enabling Trafrfic Engineering on CE-CE Paths Across a Provider Network", by Jean-Philippe Vasseur, on Dec. 14, 2005, 52 pgs.

U.S. Appl. No. 11/184,586, entitled "Dynamic Enforcement of MPLS-TE Inter-Domain Policy and QOS", by Jean-Philippe Vasseur, et al., on Jul. 19, 2005, 35 pgs.

* cited by examiner

MANAGING AN AMOUNT OF TUNNELS IN A COMPUTER NETWORK

TECHNICAL FIELD

The present disclosure relates generally to computer networks, and, more particularly, to managing an amount of available tunnels in a computer network.

BACKGROUND

Computer networks may be used to communicate data between a sender and one or more receivers. The data, e.g., in the form of one or more packets, traverses paths that comprise network elements, such as nodes and links, between the sender and the receiver, generally along a computed shortest path between the sender and receiver based on one or more path metrics (e.g., cost). Often, customers may desire configuration of a private network to protect the privacy and security of their data within the private network. Sometimes, however, a customer may have multiple network locations that are distanced from one another in such a way that to maintain a private network, substantial costs (e.g., monetary) may be required. A Virtual Private Network (VPN) is a private data network that utilizes public networks to enable communication between distanced members of the same VPN (e.g., the customer's private network). For instance, privacy may be maintained between customer networks that span the public networks (e.g., a service provider network) through the use of various tunneling protocols and security features, as will be understood by those skilled in the art.

Illustratively, a source device (sender) in a one customer network may wish to send data to a destination device (receiver) in another customer network of the same VPN across the service provider (e.g., public) network. Accordingly, the source device transmits the data (traffic) to a customer edge device (CE) of the source device's customer network, which is in communication with an ingress provider edge device (PE) of the provider network. The service provider network (e.g., a "core") transmits the traffic to an egress PE interconnected with a CE of the customer network that has the destination device, and that CE forwards the traffic toward the destination device.

Some customers desire tunnels over the paths from one CE to another CE across the provider network ("CE-CE paths"), such as for reserved bandwidth, fast convergence, fast reroute (FRR), diverse paths, etc., as will be understood by those skilled in the art. Service providers and customers may desire to have these and other benefits applied to CE-CE paths in their provider/customer network (e.g., their VPN), such as for backup data centers, voice over IP (VoIP) traffic (e.g., C4 switches to carry legacy voice traffic), etc.

Generally, the configuration for CE-CE tunnels may be agreed upon in a service contract (service level agreement, SLA) between a customer and the service provider, e.g., as applied to a particular VPN. For instance, the contract/agreement may specify a certain number of CE-CE tunnels and/or total bandwidth of those tunnels that a customer may utilize. One problem associated therewith is that it is difficult for a service provider to effectively manage (control) the number and/or total bandwidth of the CE-CE tunnels utilized by the customer where responsibility for such control is distributed across multiple nodes (PEs) of the provider network. For example, in a service provider network having such a distributed control policy, each PE is responsible for determining whether the customer may exceed the contracted number of tunnels when establishing a new tunnel. However, it is generally difficult and cumbersome for each PE to determine what tunnels have been established and/or torn down anywhere within the network; in fact, it may be sufficiently burdensome for a PE to even correctly estimate whether the customer is in excess of the contract. In other words, there remains a need for an efficient and scalable manner to manage an amount (e.g., number and/or total bandwidth) of tunnels in a computer network that utilizes a distributed control policy.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
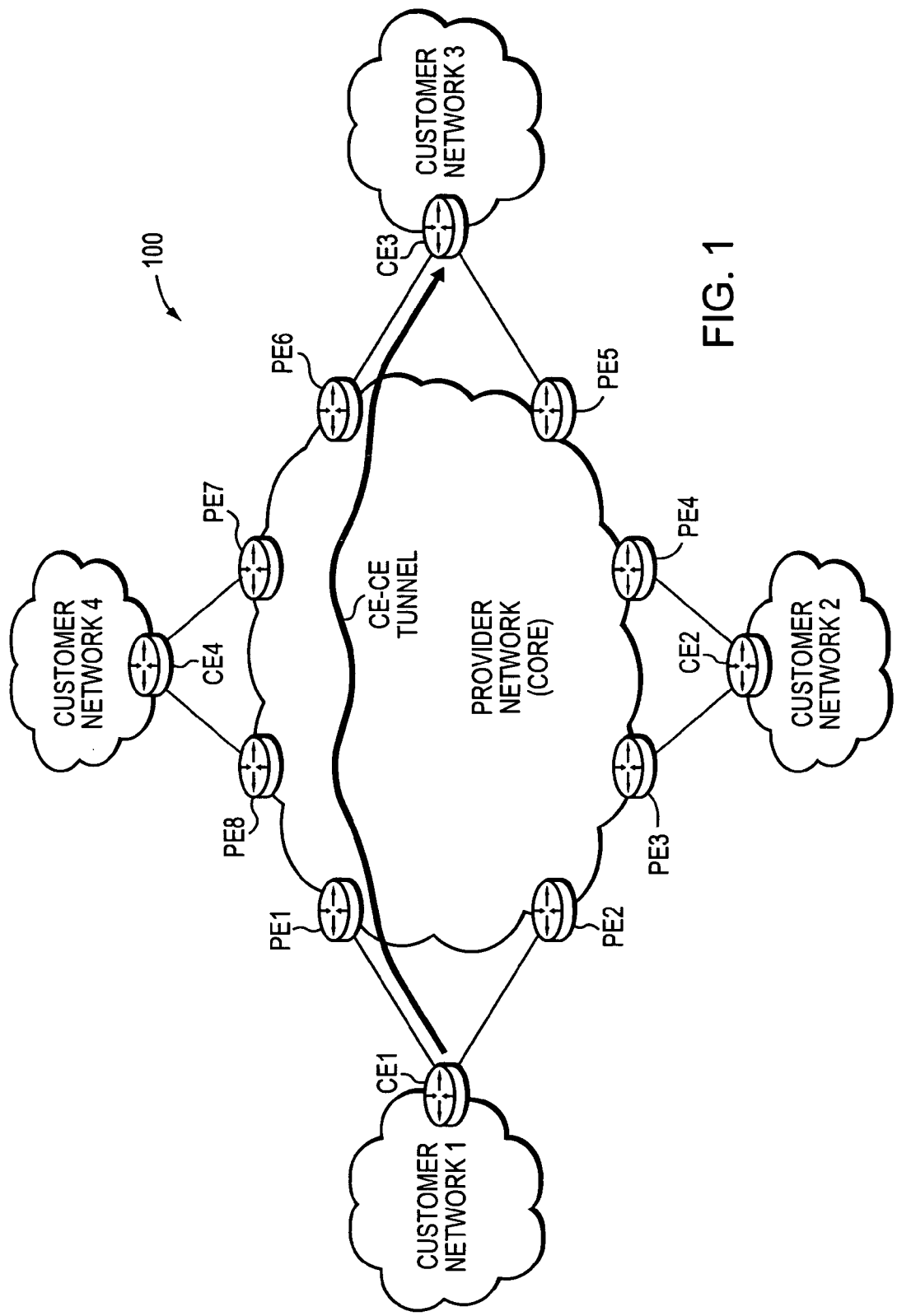
FIG. 1 illustrates an example computer network.

According to embodiments of the disclosure, a maximum amount of available tunnels in a computer network to be shared by one or more path computation devices is configured on the path computation devices. Each path computation device then decrements the amount of available tunnels in response to establishment of a tunnel, and increments the amount of available tunnels in response to destruction (i.e., tear-down) of an established tunnel. Updates to the amount of available tunnels in the network may be exchanged among the path computation devices through advertisements issued by one or more devices after decrementing or incrementing the amount. A tunnel may be established (e.g., computed) in response to the amount of available tunnels being greater than or equal to the amount of the tunnel to be established.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

Network nodes belonging to the same VPN may be situated in different subnetworks, or "customer sites" (or "customer networks" interchangeably herein). Each customer site may participate in one or more different VPNs, although most often each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another.

The customer sites typically communicate with one another through a service provider network ("provider network"). The provider network is an AS that functions as a backbone network through which VPN information may be exchanged between customer sites. The provider network may include both provider edge devices (PEs), which function as ASBRs at the logical outer edge of the provider network, as well as provider (P) devices situated within the interior ("core") of the provider network. Accordingly, each customer site contains at least one customer edge device (CE) coupled to a PE in the provider network. The customer site may be multi-homed to the provider network, i.e., wherein one or more of the customer's CEs is coupled to a plurality of PEs. The PE-CE data links may be established over various physical media, such as conventional wire links, optical links, wireless links, etc., and may communicate data formatted using various network communication protocols including ATM, Frame Relay, Ethernet, Fibre Distributed Data Interface (FDDI), etc.

FIG. 1 is a schematic block diagram of an example computer network 100 illustratively comprising nodes/devices, such as in accordance with a VPN configuration described above. Illustratively, a provider network (e.g., having P devices, not shown) may be used to interconnect customer networks/sites 1-4 accordingly. For instance, PE1 and PE2 may interconnect with CE1 for customer network 1 (e.g., having customer devices, such as sources and destinations, not shown), PE3 and PE4 may interconnect with CE2 for customer network 2, PE5 and PE6 may interconnect with CE3 for customer network 3, and PE7 and PE8 may interconnect with CE4 for customer network 4. As used herein, an "ingress PE" refers to a PE that may be used by the CEs to forward traffic into the provider network, and an egress PE refers to a PE that forwards traffic out of the provider network to a CE. Note that generally all PEs are both ingress and egress PEs, but for purposes of illustration, when referring to the directional flow of data (traffic), certain PEs may be ingress PEs, while others may be egress PEs, as described herein. Those skilled in the art will understand that any number of nodes, devices, links, etc. may be used in the computer network, and that the view shown herein is for simplicity. Those skilled in the art will also understand that while the embodiments described herein relate to customer and provider networks and VPNs, they may also apply to any network configuration, such as within an Autonomous System (AS) or area, or throughout multiple ASes or areas, etc.

Data packets may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

In a common VPN deployment, provider networks often provide the customer sites with layer-3 network-based VPN services that utilize IP and/or Multi-Protocol Label Switching (MPLS) technologies. These networks are typically said to provide "MPLS/VPN" services. This widely-deployed MPLS/VPN architecture is generally described in more detail in the IETF publication RFC 4364, entitled *BGP/MPLS IP Virtual Private Networks (VPNs)*, by E. Rosen et al., published February 2006, which is hereby incorporated by reference as though fully set forth herein.

Figure 2:
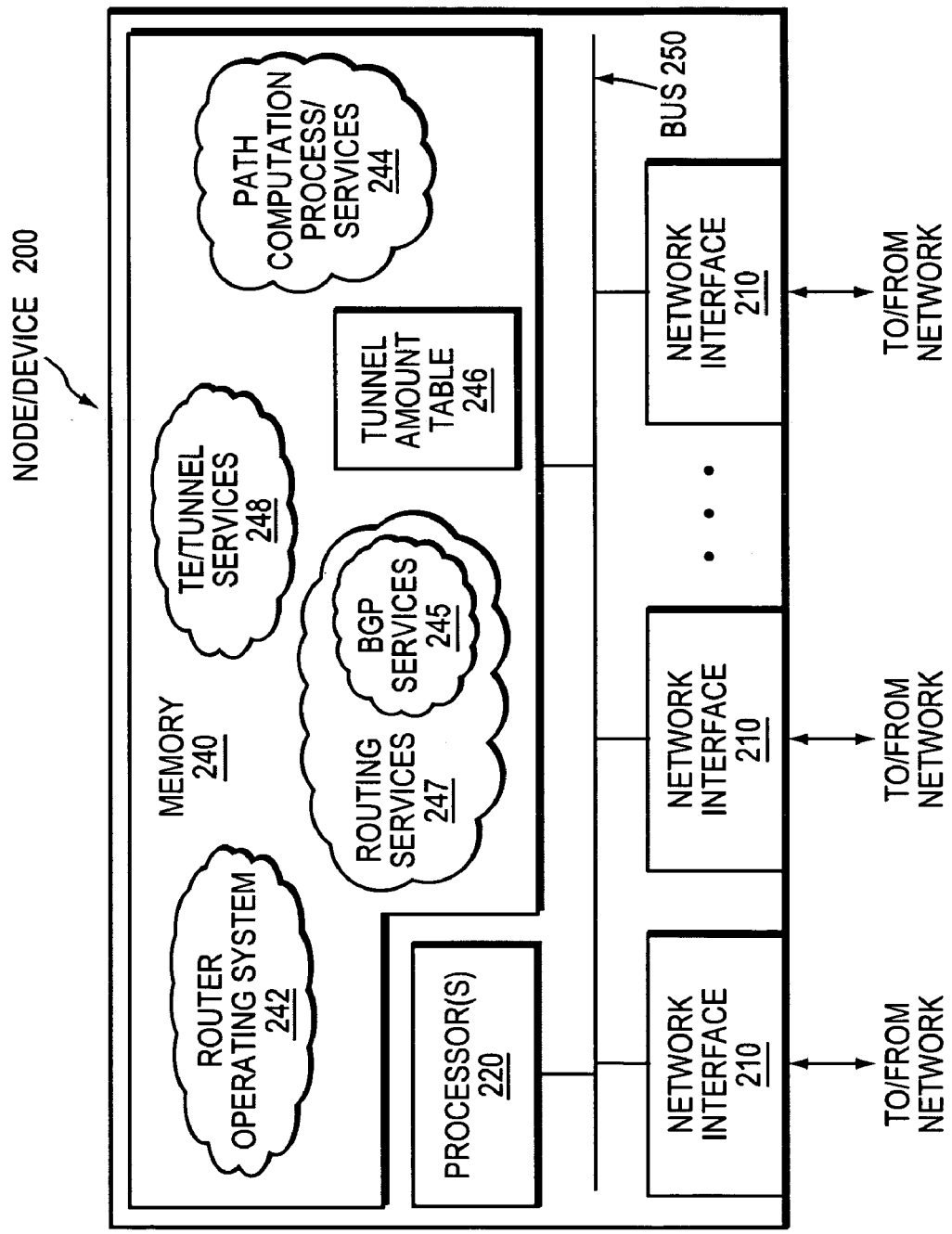
FIG. 2 illustrates an example network device/node.

FIG. 2 is a schematic block diagram of an example node/device 200 that may be advantageously used with one or more embodiments described herein, e.g., as a provider and/or customer edge device (PE and/or CE). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as one or more tables 246. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247, Border Gateway Protocol (BGP) services 245, Traffic Engineering (TE)/Tunnel services 248, and a path computation process/services 244, as described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the BGP (e.g., as BGP services 245), etc., as will be understood by those skilled in the art. These functions may be configured to manage routing and forwarding tables (not shown) containing, e.g., data used to make routing and forwarding decisions. Notably, routing services 247 may also perform functions related to virtual routing protocols, such as maintaining virtual routing and forwarding (VRF) instances (e.g., of routing and forwarding tables) as will be understood by those skilled in the art.

BGP services 245 may be used during communication of network reachability information among devices 200 between the customer and provider networks, such as through the transmission and analysis of BGP advertisements. Suppose, for example, that a new address prefix is established within a network (e.g., an AS) or a new connection is created between the provider network and/or the one or more customer networks. Once the change in the network's state is detected by one of the BGP enabled devices, that device may transmit a BGP advertisement communicating the change to the other networks (ASes). BGP services 245 of other network nodes receive the advertisements, update their internal routing/reachability information, and may continue to transmit BGP advertisements with the new information as understood by those skilled in the art.

Figure 3:
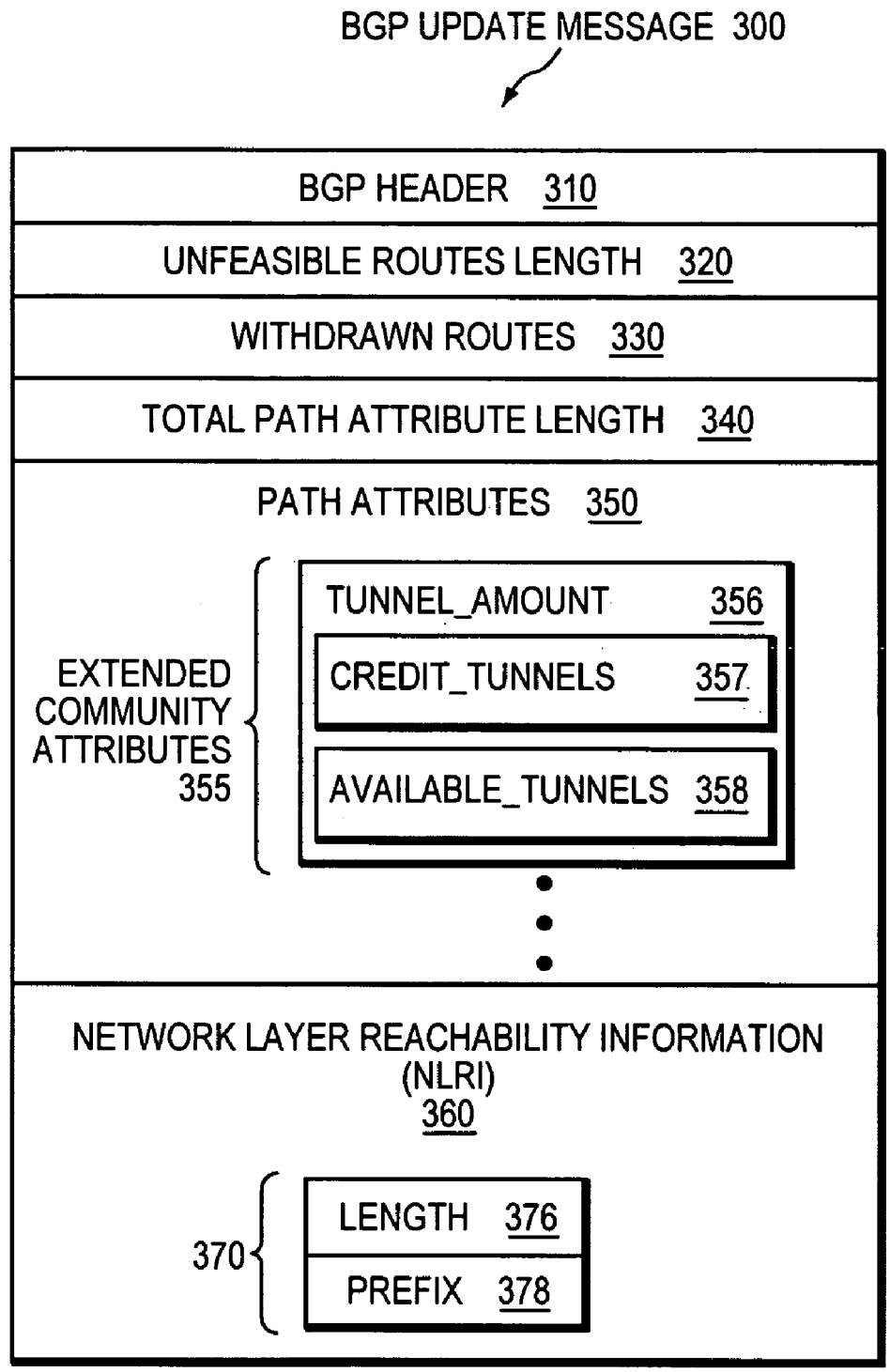
FIG. 3 illustrates an example BGP advertisement.

FIG. 3 illustrates an example BGP advertisement 300 that may be transmitted by BGP enabled routers 200 (e.g., PEs as described herein). Illustratively, the BGP advertisement 300 is a BGP update message. The packet includes a BGP header 310, unfeasible routes length field 320, withdrawn routes field 330, total path attribute length field 340, path attributes field 350, and network layer reachability information (NLRI) field 360. The BGP header 310 contains the type of BGP message (e.g., an update message), the overall length of the message, and other known information, such as predictable authentication data. The unfeasible routes length field 320 denotes the variable length of the withdrawn routes field 330, which contains a list of routes that are no longer used (or advertised) by the advertising BGP node. Notably, if the update message 300 only advertises feasible routes, the withdrawn routes field 330 need not be present.

The total path attribute length field 340 indicates the variable length of the path attributes field 350. Path attributes field 350 contains a sequence of optional path attributes, each attribute defining an attribute type, attribute length, and attribute value, such as, e.g., a multi-exit discrimination (MED) attribute (not shown). The MED attribute is a well-known optional non-transitive attribute that is generally used to discriminate among multiple exit or entry points to the same neighboring AS. Other attributes may be included within the Path attributes field 350, such as BGP extended community attributes 355 (e.g., a novel "TUNNEL_AMOUNT" attribute 356 as described below). As will be understood by those skilled in the art, each BGP attribute and extended community attribute may be defined with a specific type value. Particularly, BGP extended community attributes are described further in RFC 4360, entitled *BGP Extended Communities Attribute*, dated February 2006 by Sangli et al., which publication is publicly available through the IETF and is hereby incorporated by reference in its entirety.

The Network Layer Reachability Information (NLRI) field 360 contains a list of address prefixes, whose length is calculated using the overall length of the BGP message 300 contained within the BGP header 310. Reachability information in the NLRI field 360 comprises one or more encoded entries 370, each containing a length field 376 signifying the length of a prefix field 378. The prefix field 378 contains destination address prefixes that are reachable via, e.g., the originating (advertising) node, as described herein. Notably, a prefix 378 of zero length indicates a prefix that matches all destination addresses. In general, BGP update message 300 can advertise at most one route to a set of destination prefixes, and all path attributes 350 (and extended community attributes 355) apply to the entire set of destination prefixes contained in the NLRI field 360.

Conventionally, BGP attributes and extended community attributes may include one or more variable length fields (TLVs), to be used in accordance with one or more embodiments described herein. In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
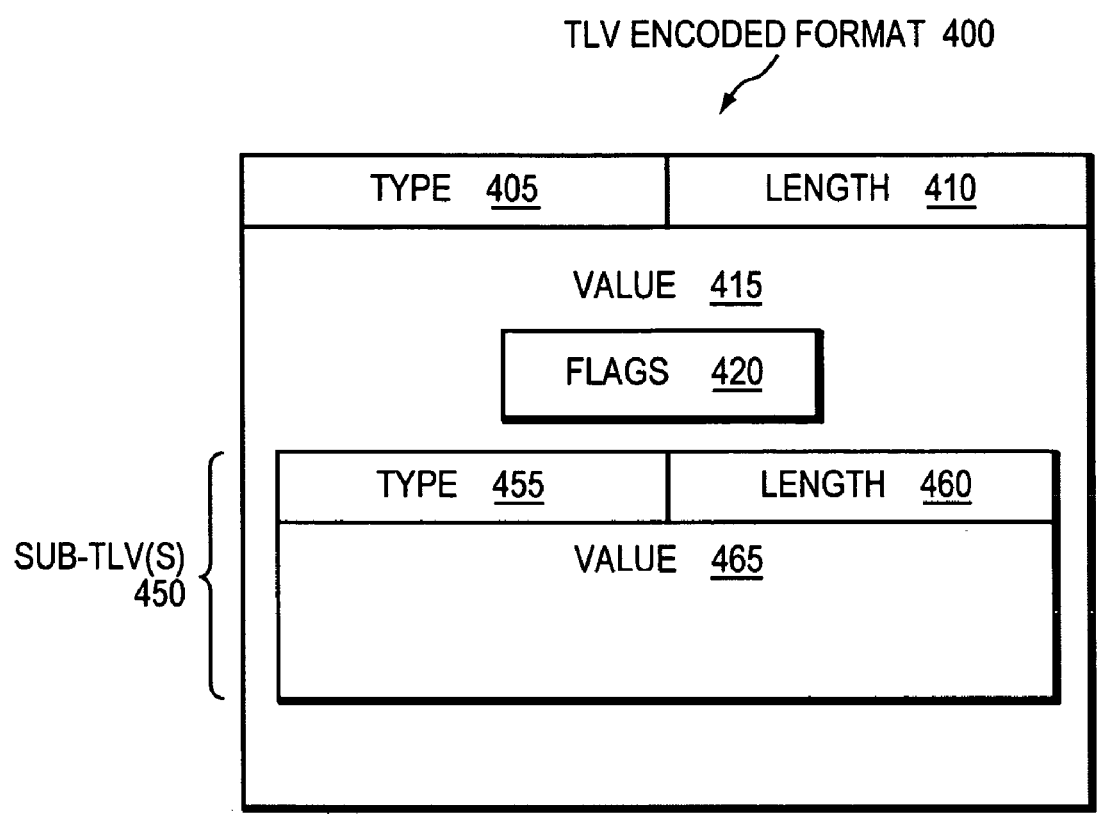
FIG. 4 illustrates an example TLV encoded format.

FIG. 4 is a schematic block diagram illustrating the TLV encoded format 400 that may be advantageously used with the one or more embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

As mentioned above, the provider network may employ MPLS/VPN services. MPLS Traffic Engineering (TE) has been developed to meet data networking requirements such as guaranteed available bandwidth and/or fast restoration (Fast Reroute, FRR). MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE. Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

TE/Tunnel services 248 contain computer executable instructions for implementing TE and/or tunneling functions in accordance with the embodiments described herein. For instance, services 248 may provide one or more protocols useful for establishing and maintaining tunnels and their associated operation, such as, e.g., MPLS, MPLS-TE, the Resource ReSerVation Protocol (RSVP), etc., as will be understood by those skilled in the art. Notably, RSVP is a network-control protocol that enables applications to reserve resources in order to obtain special "quality of service" (QoS) for their data flows.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node (e.g., a PCE as described in RFC 4655 by Farrel, Vasseur, and Ash, entitled *A Path Computation Element (PCE)-Based Architecture*, dated August 2006, the contents of which are hereby incorporated by reference as though fully set forth herein). The head-end node (or a PCE) exploits its knowledge of network topology and resources available on each link to perform the path computation according to the LSP Traffic Engineering constraints. Various path computation methodologies are available including CSPF (constrained shortest path first). Notably, when incorporating the use of PCEs, the path computation request (and response) between path computation client (PCC) and PCE can be exchanged in accordance with a protocol specified in Vasseur, et al., *Path Computation Element (PCE) Communication Protocol (PCEP)-Version* 1-<*draft-ietf-pce-pcep*-03.*txt*>, Internet Draft, October 2006, the contents of which are hereby incorporated by reference in its entirety. It should be understood that the use of PCEP serves only as an example, and that other communication protocols may be used in accordance with the present invention.

Generally, because a CE is not aware of the network topology within the service provider network, in order to compute a path for a CE-CE tunnel, the CE requests a path from a locally attached PE (e.g., CE1 may request from either PE1 or PE2). In this manner, the attached PE acts as a path computation device (or PCE), while the requesting CE (a requestor) is a path computation client (PCC). Notably, the locally attached PE may forward the path computation request to a dedicated PCE within the service provider network. Illustratively, however, each PE is configured to compute the path itself in a distributed manner (e.g., each PE computes a path segment and such segments are then concatenated to form the entire path or in some instances the local PE may be able to compute the entire path).

As noted, it is often difficult for a service provider to effectively control the amount (e.g., number and/or total bandwidth) of CE-CE tunnels utilized in its network, particularly where responsibility for such control is distributed across multiple nodes (PEs) of the provider network (e.g., where the PEs are the path computation devices that enforce a control policy). One solution to this problem may utilize centralized authorities within the provider network, such as the known Common Open Policy Service (COPS) with its centralized policy server. In COPS, for example, devices communicate messages to the centralized policy server, which then accumulates the messages and returns aggregated updates to the devices. (An example use of COPS in this manner is described in commonly-owned copending U.S. patent application Ser. No. 11/184,586 filed Jul. 19, 2005 by Vasseur et al., entitled DYNAMIC ENFORCEMENT OF MPLS-TE INTER-DOMAIN POLICY AND QOS.) Arrangements utilizing a centralized authority are generally well suited for limited distribution of devices, but may become overburdened with large numbers of devices and corresponding states to maintain. The techniques described herein, therefore, alleviate the need for a centralized authority to manage policy within a network, particularly to policy relating to an amount of tunnels in the network.

Managing an Amount of Tunnels in a Network

According to embodiments of the disclosure, a maximum amount of available tunnels in a computer network to be shared by one or more path computation devices is configured on the path computation devices. Each path computation device then decrements the amount of available tunnels in response to establishment of a tunnel, and increments the amount of available tunnels in response to destruction (i.e., tear-down) of an established tunnel. Updates to the amount of available tunnels in the network may be exchanged among the path computation devices through advertisements issued by one or more devices after decrementing or incrementing the amount. A tunnel may be established (e.g., computed) in response to the amount of available tunnels being greater than or equal to the amount of the tunnel to be established.

In accordance with one or more embodiments described herein, a maximum amount of tunnels ("CREDIT_TUNNELS") that can be established at a given time may be configured, e.g., by a service provider for a particular customer. For instance, the maximum amount may be defined in terms of a certain number of tunnels (e.g., 100), in terms of a certain total bandwidth of the tunnels (e.g., 100 Mbps), or in terms of both (e.g., up to 100 tunnels and up to 100 Mbps). In addition, the maximum amount of tunnels may be configured specifically for a particular VPN, for a particular class of tunnel, a particular type of tunnel, etc. (As used herein, assume that the maximum is a general amount of tunnels that may be shared by customer networks 1-4.)

Also, a new BGP attribute (e.g., a BGP Path Attribute 350, or illustratively an Extended Community Attribute 355) may be defined and denoted "TUNNEL_AMOUNT" 356. Accordingly, the TUNNEL_AMOUNT attribute 356 may be embodied as a TLV 400, having two sub-TLVs 450 corresponding to an optional CREDIT_TUNNELS sub-TLV 357 and an "AVAILABLE_TUNNELS" sub-TLV 358, which reflects a current amount of tunnels that may still be established. Initially, with no tunnels established in the network, AVAILABLE_TUNNELS is equal to CREDIT_TUNNELS. As described below, as tunnels are established, AVAILABLE_TUNNELS equals CREDIT_TUNNELS minus an amount of tunnels currently established in the network.

The values for CREDIT_TUNNELS and AVAILABLE_TUNNELS may be is stored at each path computation device in a corresponding tunnel amount table 246, which is managed and maintained by path computation services 244 as described herein. Notably, the values may be initialized manually on each path computation device of the network, or, illustratively, updated through the use of BGP update messages shared between all interested path computation devices of the network. That is, upon receiving a BGP update message 300 that has the novel TUNNEL_AMOUNT attribute 356, a path computation device 200 updates its locally stored table 246 according to the values contained therein (e.g., storing the values as contained therein or adjusting the values based on a degree of change, as described below).

Operationally, a head-end node of a tunnel (e.g., a CE, such as CE1) sends a path computation request to a locally attached PE (e.g., PE1, a path computation device or PCE) for a CE-CE tunnel (e.g., to CE3) (or a set of tunnels, accordingly). Illustratively, the head-end node may send a PCEP request message, e.g., a "PCReq" message, which may include the source and destination addresses of the desired tunnel, along with other properties such as a desired bandwidth and/or other constraints, as will be understood by those skilled in the art.

Figure 5:
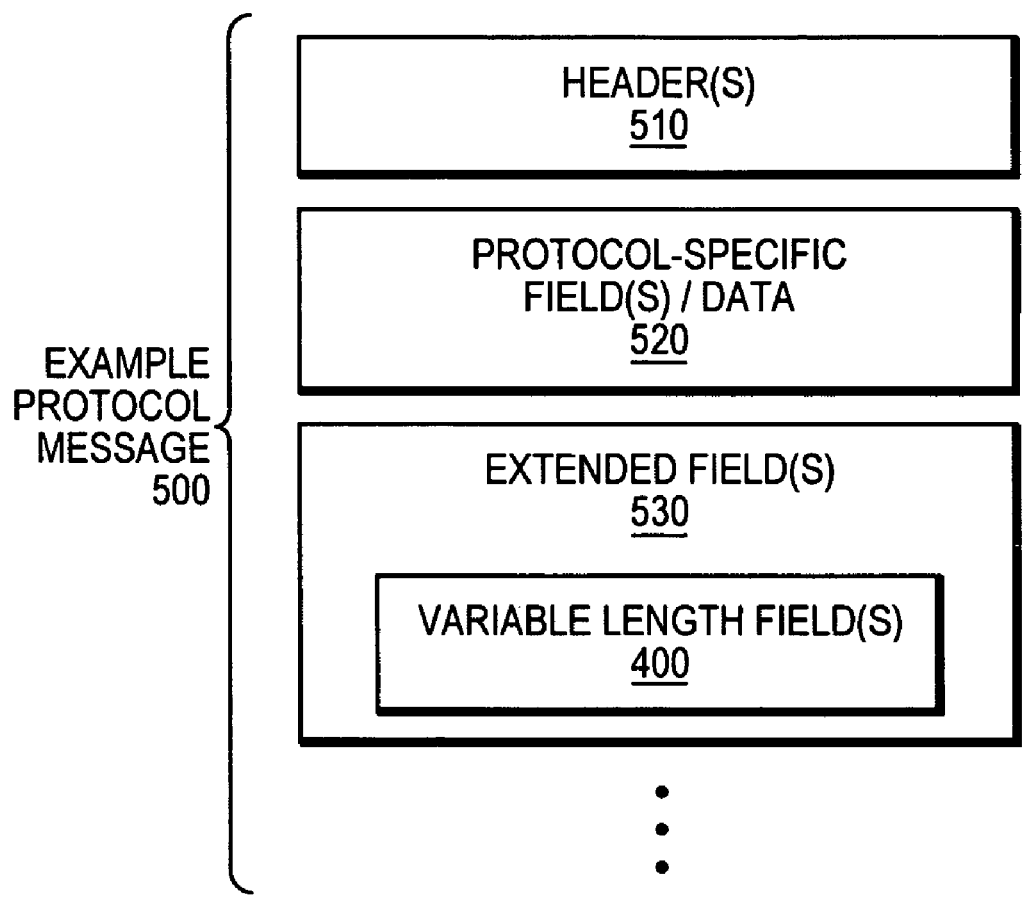
FIG. 5 illustrates an example generic protocol message.

FIG. 5 is a schematic block diagram illustrating a generic protocol message 500 that may be transmitted by nodes/devices 200 (e.g., CEs and PEs) according to various protocols in accordance with the embodiments described herein, such as a PCEP message 500, etc. Illustratively, the message 500 is shown as a high-level generic message, and those skilled in the art will understand that more specific messages may comprise other fields accordingly. The message 500 includes one or more headers 510, such as an encapsulation protocol header as well as one or more protocol-specific headers (e.g., IP headers, RSVP headers, etc.). As those skilled in the art will understand, the message 500 is sent in an encapsulation appropriate to the environment (e.g., TCP/IP, ATM, MPLS, etc.). Thus, the encapsulation protocol header of headers 510 contains information standard for the specific type of encapsulation. Protocol-specific fields/data 520 may be used to contain protocol-specific information, as will be understood by those skilled in the art. For example, a PCEP message 500 may communicate PCEP-specific information between the CEs and PEs accordingly, as described herein. Regardless of the protocol, the extended field(s) section 530 (e.g., an extension to protocol-specific fields) may include one or more variable length fields (TLVs) 400, to be used in accordance with one or more embodiments described herein.

Upon receiving the path computation request from a head-end node (e.g., CE1), the receiving path computation device (e.g., PE1) determines whether a locally stored value of AVAILABLE_TUNNELS (e.g., in tunnel amount table 246) is greater than the amount of the tunnel to be established. For instance, if the amount is measured in numbers of tunnels, the number of available tunnels should be 1 or more in order to allow establishment of a new tunnel. Conversely, if the amount is measured in bandwidth, the available bandwidth should be greater than the requested bandwidth of the tunnel (e.g., 10 Mbps). If there is a sufficient amount of AVAILABLE_TUNNELS accordingly, the receiving path computation device triggers computation of the path. Notably, an example for CE-CE path computation is described in commonly-owned copending U.S. application Ser. No. 11/302,595, filed by Vasseur on Dec. 14, 2005, for a TECHNIQUE FOR ENABLING TRAFFIC ENGINEERING ON CE-CE PATHS ACROSS A PROVIDER NETWORK, the contents of which are hereby incorporated by reference in its entirety.

Once a path is found for the tunnel (e.g., a CE-CE path for a CE-CE tunnel), the path computation device (PE1) may return the computed path to the requesting device (CE1), e.g., a PCEP reply message. In the event that there is not a sufficient amount of AVAILABLE_TUNNELS (e.g., a number less than 1 and/or a bandwidth less than the requested bandwidth), or if no path is found even though there is a sufficient amount of AVAILABLE_TUNNELS, the path computation device may return an error to the requestor accordingly.

Once the requesting head-end node (e.g., CE1) decides to utilize the returned computed path, the head-end node may attempt to establish (set up) the corresponding tunnel (e.g., a CE-CE tunnel, as seen in FIG. 1). If the establishment of the tunnel succeeds, the head-end node may send a notification to the path computation device (e.g., is PE1) indicating the success. For example, a PCEP notification message 500 ("PCNtf") may be sent that includes one or more flags 420 indicating success or failure of establishment for a tunnel. The PCNtf message 500 comprises the address of the head-end node (e.g., CE1), and optionally (e.g., for when the "amount" corresponds to bandwidth) the bandwidth reserved by the established tunnel.

The path computation device (e.g., PE1) receives the notification message, and may determine to which VPN the tunnel belongs (e.g., a VPN ID according to a VRF from which the notification was received from CE1). For that particular VPN, the stored value for AVAILABLE_TUNNELS in tunnel amount table 246 is decremented by the amount of the established tunnel (i.e., by 1 for a number of tunnels, and/or by the reserved bandwidth for available bandwidth for tunnels).

Also, in accordance with one or more embodiments described herein, a head-end node (e.g., CEC) may decide to tear down (destroy) a previously established tunnel (or the tunnel may fail). In this situation, the head-end node may send a notification to the path computation device (e.g., PE1) indicating that the tunnel was destroyed. For example, a PCEP notification message 500 ("PCNtf") may be sent that includes one or more flags 420 indicating the destruction of a tunnel, and optionally the bandwidth previously reserved by the tunnel that was destroyed. The receiving path computation device (e.g., PE1) may then increment the stored value for AVAILABLE_TUNNELS in tunnel amount table 246 by the amount of the previously established tunnel (i.e., by 1 for a number of tunnels, and/or by the reserved bandwidth for available bandwidth for tunnels). Alternatively, the PE itself may determine that a tunnel has been torn down/destroyed due to signaling of the tunnel (e.g., RSVP Path Tear messages, as will be understood by those skilled in the art).

In response to either decrementing or incrementing the stored value for AVAILABLE_TUNNELS, the path computation device may generate and send a corresponding BGP update message 300 (e.g., with TUNNEL_AMOUNT attribute 356) to all other path computation devices of the network. (Illustratively, all PEs of the network 100 are path computation devices, but there are circumstances where only a subset of the PEs us is such. In this case, non-path-computation devices may simply be adapted to ignore these BGP update messages.) Upon receiving the BGP update message 300, each path computation device correspondingly updates its locally stored value for AVAILABLE_TUNNELS in its tunnel amount table 246 in order to reflect the updated (decremented/incremented) amount. In this manner, each path computation device 200 of the network maintains an amount (number and/or bandwidth) of available tunnels (AVAILABLE_TUNNELS) that is consistent and shared among all other path computation devices. By doing so, each distributed path computation device may freely enforce a policy relating to the maximum amount of tunnels in the network.

As a brief example, assume that CREDIT_TUNNELS is originally set to a maximum number of 10 tunnels to be shared by customer networks 1-4 (e.g., of a same VPN). CE1 establishes 3 tunnels through PE1, and 3 tunnels through PE2 (e.g., for diverse paths to each customer network 2-3, as will be understood by those skilled in the art). PE1 decrements its AVAILABLE_TUNNELS to 7, and sends a BGP update message 300 to all of the path computation devices (e.g., PE2-PE8), which correspondingly update their AVAILABLE_TUNNELS to 7. PE2 then decrements its updated AVAILABLE_TUNNELS value by 3 to a new value of 4, and sends the new value via a BGP update message 300 to the other path computation devices. Assume that this process continues until AVAILABLE_TUNNELS equals 0, i.e., 10 tunnels have been established. If a CE (e.g., CE3) requests a path for a tunnel from PE5, PE5 determines that there are no more available tunnels, and rejects the path computation request accordingly. Now, if a CE (e.g., CE1) sends a notification to one of its locally attached PEs (PE1) that a tunnel has been destroyed, PE1 increments its AVAILABLE_TUNNELS value from 0 to 1, and sends the update reflecting this incremented value to the other PEs. If CE3 then sends the same request to PE5, PE5 determines that one tunnel is available, and complies with the path computation request accordingly. (Notably, PE5 may send a notification to CE3 upon detection of the available tunnel, e.g., where PE5 is configured to remember, the initial request from CE3.) Those skilled in the art will appreciate that this sort of "token-based" approach may also apply to available bandwidth in a similar manner.

In accordance with one or more embodiments described herein, the number of BGP update message 300 sent between path computation devices 200 may be reduced by implementing a threshold-based update algorithm. For example, the threshold may be a timer-based threshold (e.g., only sending once every five minutes), or a value based, such as sending at certain values (e.g., 15, 10, 5, etc.) or at certain changes in values (e.g., once the value is incremented or decremented 5 tunnels away from the previous value), etc. Also, the thresholds need not be equally spaced, such as implementing smaller thresholds as the value of AVAILABLE_TUNNELS approaches zero (e.g., sending at 15, 10, 7, 5, 4, 3, 2, 1, 0, etc.).

When utilizing threshold-based updates, it may be beneficial to configure the path computation devices to send BGP update messages that indicate an amount of change to the AVAILABLE_TUNNELS value, in addition to or as an alternative to the actual value. For instance, assume the above-described 10 tunnel maximum for CREDIT_TUNNEL and a timer-based threshold. After 5 minutes, two path computation devices (having incremented and decremented their own tables 246 locally) may send out messages indicating a final changed state, e.g., decremented by 3 and 2, respectively (i.e., 5 new tunnels were created, thus 5 remain available). If each device simply sent an update with its locally stored value (7 and 8, respectively), the path computation devices receiving the updates would either (i) determine that the updates were originated by different devices and aggregate the changes accordingly, or (ii) store an erroneous value (e.g., 7 or 8). By sending the degree of change in the update messages, each receiving device may aggregate the updates for its updated AVAILABLE_TUNNELS value.

Those skilled in the art will appreciate that threshold-based updates and/or race conditions (i.e., where more than one path computation device service a request at the same time and send BGP updates at the same time for the same available tunnel) may also result in a negative value (below zero) for the amount of AVAILABLE_TUNNELS. Accordingly, the path computation devices may simply be configured to prevent establishment of a tunnel until a corresponding amount of tunnels are destroyed in order to increment the amount of available tunnels above zero.

Figure 6:
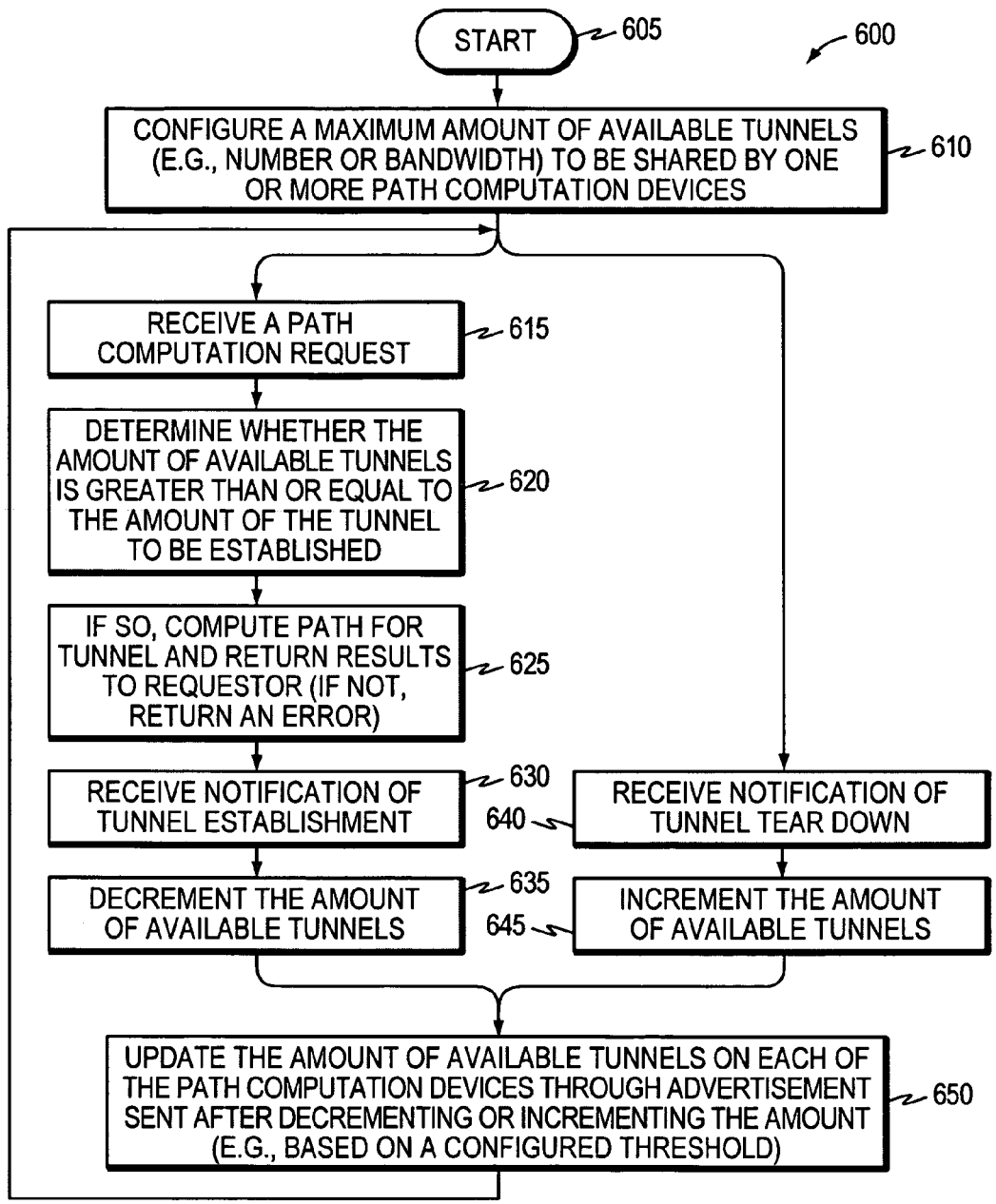
FIG. 6 illustrates an example procedure for managing an amount of tunnels in a computer network.

FIG. 6 illustrates an example procedure for managing an amount of tunnels in accordance with one or more embodiments described herein. The procedure 600 starts at step 605, and continues to step 610, where a maximum amount of available tunnels (CREDIT_TUNNELS, e.g., a number or bandwidth) to be shared by one or more path computation devices 200 (e.g., for a particular VPN) is configured on the path computation devices. If a path computation device (e.g., PE1) receives a path computation request in step 615 from a PCC (e.g., CE1), then the path computation device determines in step 620 whether the amount of available tunnels (AVAILABLE_TUNNELS) is greater than or equal to the amount of the tunnel to be established. For instance, as described above, if CE1 requests a path for a 10 Mbps tunnel, PE1 may determine whether at least one tunnel is available, whether 10 Mbps of bandwidth is available, or both. If sufficient tunnel availability exists, the path computation device (PE1) computes a path for the tunnel in step 625, and returns the results to the requestor (CE1). If there is not sufficient tunnel availability, the path computation device may return an error to the requestor (also step 625).

Once a computed path is returned to the requester, the path computation device may receive a notification of successful tunnel establishment (e.g., a PCEP message 500, PCNtf or RSVP signaling) in step 630, which may be sent from the requestor in the event the requestor has established the tunnel over the requested path. As a result, the path computation device decrements the amount of available tunnels (AVAILABLE_TUNNELS) in step 635, e.g., a corresponding number (1) and/or bandwidth (10 Mbps), in the tunnel amount table 249, as described above.

In addition to receiving requests for paths and notifications of successful tunnel establishment, a path computation device 200 may also receive a notification of a tunnel being destroyed (torn down) in step 640. In response, the path computation device increments the amount of available tunnels (AVAILABLE_TUNNELS) in step 645, e.g., a corresponding number and/or bandwidth in the tunnel amount table 246, as described above.

After decrementing or incrementing the available tunnels in steps 635 or 645 (respectively), the path computation device may update the amount of available tunnels on each of the path computation devices through advertisement (Step 650) using, e.g., the TUNNEL_AMOUNT BGP attribute 356 of BGP update message 300. Notably, the update messages may be sent after each change to AVAILABLE_TUNNELS, or in response to a configured threshold (e.g., a minimum change and/or timer-based threshold). As noted above, in the event a threshold update is sent, the update message may include a total change in AVAILABLE_TUNNELS, in addition to or as an alternative to the actual amount of available tunnels. The procedure 600 then proceeds such that the path computation device may continue to receive requests (step 615) and notifications (635 and/or 645), and operate accordingly to maintain an updated status of the amount of available tunnels for the network (e.g., VPN).

Advantageously, the novel techniques described herein manage an amount of tunnels in a computer network. Through the use of a distributed "token-based" algorithm as described herein, the novel techniques provide for distributed tunnel control admission across multiple nodes (e.g., entry points, PEs) of a network by maintaining a global variable that is updated among the nodes (e.g., using BGP), rather than having to rely on a centralized authority. In particular, the techniques described above may be used to control the maximum number of tunnels that may be established in a network, notably in an efficient manner as each path computation device need only maintain a single variable (AVAILABLE_TUNNELS) per network (e.g., per VPN), as opposed to maintaining less scalable state (e.g., as in COPS). Also, the dynamic aspects of one or more embodiments described herein alleviate the need for cumbersome and inefficient manual configuration.

While there have been shown and described illustrative embodiments that manage an amount of tunnels in a computer network, it is to be understood that various other adaptations and modifications may be made within the spirit and scope of the present invention. For example, the embodiments have been shown and described herein for use with customer and provider networks (e.g., MPLS/VPN networks), particularly for CE-CE tunnels. However, the embodiments of the invention in their broader sense are not so limited, and may, in fact, be used with any type of tunnels traversing any network (e.g., within a network, through a network, entering a network, leaving a network, etc.). Also, while the above description describes updating the path computation devices with BGP update messages, other update communication protocols shared by the path computation devices may be used, e.g., IGP, PCEP, specific protocols, etc., where each protocol is used to notify the path computation devices of the incrementing and/or decrementing of the amount of available tunnels accordingly. Further, while the illustrative example of a tunnel is an MPLS TE-LSP, other tunnels may be used in accordance with the embodiments described herein, such as, e.g., Layer Two Tunnel Protocol (L2TP) tunnels, the Point-to-Point Tunneling Protocol (PPTP) tunnels, and IP tunnels.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
configuring a maximum amount of available tunnels that may be established in a network, the maximum amount of available tunnels that may be established to be shared by one or more path computation devices;
decrementing the maximum amount of available tunnels that may be established in response to establishment of a tunnel;
incrementing the maximum amount of available tunnels that may be established in response to destruction of an established tunnel;
advertising an updated maximum amount of available tunnels that may be established in the network to each of the path computation devices, after one of either decrementing or incrementing the maximum amount; and
establishing a tunnel in response to the maximum amount of available tunnels that may be established being greater than or equal to the amount of the tunnel to be established.

2. The method as in claim 1, wherein the maximum amount of available tunnels that may be established is measured by an available number of tunnels, and wherein the steps of decrementing and incrementing comprise decrementing and incrementing by one tunnel for each tunnel established and destroyed, respectively.

3. The method as in claim 1, wherein the maximum amount of available tunnels that may be established is measured by an available bandwidth for the tunnels, and wherein the steps of decrementing and incrementing comprise decrementing and incrementing by an amount of bandwidth corresponding to a bandwidth for each tunnel established and destroyed, respectively.

4. The method as in claim 1, wherein the tunnels originate and terminate at customer edge devices across a service provider network.

5. The method as in claim 1, wherein the path computation devices are provider edge devices of a service provider network.

6. The method as in claim 1, wherein the path computation devices are Path Computation Elements (PCEs).

7. The method as in claim 1, further comprising:
advertising the maximum amount of available tunnels that may be established through Border Gateway Protocol (BGP) advertisements.

8. The method as in claim 7, further comprising:
advertising the maximum amount of available tunnels that may be established through one or more BGP attributes within the BGP advertisements.

9. The method as in claim 1, further comprising:
receiving a request to compute a path from a requestor;
determining whether the maximum amount of available tunnels that may be established is greater than or equal to the amount of the tunnel to be established;
computing the path in response to the maximum amount of available tunnels that may be established being greater than or equal to the amount of the tunnel to be established; and
returning the computed path to the requestor.

10. The method as in claim 1, further comprising:
receiving, at a path computation device, a notification that a tunnel has been successfully established; and
decrementing the maximum amount of available tunnels that may be established according to the established tunnel.

11. The method as in claim 1, further comprising:
receiving, at a path computation device, a notification that a tunnel has been successfully destroyed; and
incrementing the maximum amount of available tunnels that may be established according to the destroyed tunnel.

12. The method as in claim 1, wherein the maximum amount of available tunnels that may be established is maintained for a particular Virtual Private Network (VPN).

13. The method as in claim 1, wherein the maximum amount of available tunnels that may be established is maintained for a particular class and type of tunnel.

14. The method as in claim 1, further comprising:
advertising the maximum amount of available tunnels that may be established after a change in the amount greater than a configurable threshold.

15. The method as in claim 14, wherein the threshold is based on a closeness of the maximum amount of available tunnels that may be established to being zero.

16. The method as in claim 14, further comprising:
allowing the maximum amount of available tunnels that may be established to become negative after receiving an advertisement from a path computation device using the threshold; and
preventing establishment of a tunnel until a corresponding amount of tunnels are destroyed in order to increment the maximum amount of available tunnels that may be established above zero.

17. The method as in claim 14, wherein the configurable threshold is a timer-based threshold.

18. A node, comprising:
one or more network interfaces adapted to communicate with one or more path computation devices;
one or more processors coupled to the network interfaces and adapted to execute one or more processes; and
a memory adapted to store a maximum amount of available tunnels that may be established in a computer network, the maximum amount of available tunnels that may be established to be shared by one or more path computation devices, the memory further adapted to store a path computation process executable by each processor, the path computation process when executed operable to: i) decrement the maximum amount of available tunnels that may be established in response to establishment of a tunnel; ii) increment the maximum amount of available tunnels that may be established in response to destruction of an established tunnel; iii) send and receive advertisements for an updated maximum amount of available tunnels that may be established to each of the path computation devices, after one of either decrementing or incrementing the maximum amount; and v) compute a path for a new tunnel to establish in response to the maximum amount of available tunnels that may be established being greater than or equal to the amount of the tunnel to be established.

19. The node as in claim 18, wherein the maximum amount of available tunnels that may be established is measured in one of either an available number of tunnels or an available bandwidth for the tunnels.

20. An apparatus, comprising:
means for configuring a maximum amount of available tunnels that may be established in a network, the maximum amount of available tunnels that may be established to be shared by one or more path computation devices;
means for decrementing the maximum amount of available tunnels that may be established in response to establishment of a tunnel;
means for incrementing the maximum amount of available tunnels that may be established in response to destruction of an established tunnel;
means for advertising an updated maximum amount of available tunnels that may be established to each of the path computation devices, after one of either decrementing or incrementing the maximum amount; and
means for establishing a tunnel in response to the maximum amount of available tunnels that may be established being greater than or equal to the amount of the tunnel to be established.

21. A method, comprising:
configuring a maximum amount of available tunnels that may be established in a network, the maximum amount of available tunnels that may be established to be shared by a plurality of path computation devices;
receiving a path computation request for a tunnel;
determining the maximum amount of available tunnels that may be established is greater than or equal to an amount of the tunnels to be established;
in response to the determining, computing a path for the tunnel;
decrementing the maximum amount of available tunnels that may be established; and
after decrementing the amount, advertising an updated maximum amount of available tunnels that may be established in the network to each of the path computation devices using one or more Border Gateway Protocol (BGP) attributes within a BGP advertisement.

22. The method as in claim 21, wherein the amount of available tunnels that may be established is measured by an available number of tunnels, and wherein the decrementing comprises decrementing by one tunnel.

23. The method as in claim 21, wherein the maximum amount of available tunnels that may be established is measured by an available bandwidth for the tunnels, and wherein the decrementing comprises decrementing by an amount of bandwidth corresponding to a bandwidth for the tunnel.

* * * * *

UNITED STATES PATENT AND TRADEMARK OFFICE
CERTIFICATE OF CORRECTION

PATENT NO. : 7,995,500 B2  Page 1 of 1
APPLICATION NO. : 11/606973
DATED : August 9, 2011
INVENTOR(S) : Vasseur It is certified that error appears in the above-identified patent and that said Letters Patent is hereby corrected as shown below:

Col. 10, line 45: "described herein, a head-end node ~~(e.g., CEC)~~ (e.g., CE1) may decide to"

Col. 12, line 40: "Once a computed path is returned to the ~~requester~~ requestor, the path"

Signed and Sealed this
Third Day of April, 2012

David J. Kappos
*Director of the United States Patent and Trademark Office*